United States Patent [19]

Medlock

[11] Patent Number: 5,284,299
[45] Date of Patent: Feb. 8, 1994

[54] PRESSURE COMPENSATED HVLP SPRAY GUN

[75] Inventor: D. William Medlock, Indianapolis, Ind.

[73] Assignee: Ransburg Corporation, Indianapolis, Ind.

[21] Appl. No.: 933,561

[22] Filed: Aug. 24, 1992

Related U.S. Application Data

[63] Continuation of Ser. No. 667,459, Mar. 11, 1991, abandoned.

[51] Int. Cl.[5] .............................................. B05B 7/12
[52] U.S. Cl. ............................... 239/301; 239/290; 239/412; 239/526; 239/533.1
[58] Field of Search ............... 239/290, 300, 301, 412, 239/533.1, 570, 572, DIG. 22, 526; 137/505.42

[56] References Cited

U.S. PATENT DOCUMENTS

| | | | |
|---|---|---|---|
| 167,212 | 8/1875 | Bates | 137/505.42 |
| 1,465,654 | 8/1923 | Radtke | 137/505.42 X |
| 1,541,958 | 6/1925 | Horawa | 137/505.42 |
| 1,712,697 | 5/1929 | Frankenberg | 137/505.42 |
| 1,982,055 | 11/1934 | Jenkins . | |
| 2,096,196 | 10/1937 | Newlin | 239/300 |
| 2,252,200 | 8/1941 | Plummer . | |
| 2,684,838 | 7/1954 | Rush | 239/412 X |
| 2,777,456 | 1/1957 | Ey | 137/505.42 X |
| 2,904,262 | 9/1959 | Peeps . | |
| 3,327,949 | 6/1967 | Eull | 239/412 |
| 3,650,479 | 3/1972 | Liedberg . | |
| 4,131,235 | 12/1978 | Lieding | 239/570 X |
| 4,660,771 | 4/1987 | Chabert et al. . | |
| 4,798,341 | 1/1989 | Gimple | 239/694 |
| 4,828,218 | 5/1989 | Medlock . | |
| 4,911,365 | 3/1990 | Thiel et al. | 239/300 X |
| 4,915,303 | 4/1990 | Hufgard | 239/300 |
| 4,993,642 | 2/1991 | Hufgard | 239/290 X |

FOREIGN PATENT DOCUMENTS

| | | | |
|---|---|---|---|
| 207725 | 5/1957 | Australia | 239/572 |
| 0381072 | 8/1990 | European Pat. Off. . | |
| 608557 | 5/1978 | U.S.S.R. . | |

Primary Examiner—Andres Kashnikow
Assistant Examiner—William Grant
Attorney, Agent, or Firm—Schwartz & Weinrieb

[57] ABSTRACT

An improved HVLP spray gun capable of operating from a source of high pressure air. Compressed air is delivered to the gun through a relatively small diameter air hose. A pressure compensated control valve is mounted in the spray gun to reduce the air pressure delivered to an air/fluid nozzle to a predetermined pressure of no greater than 0.7 Kg/cm$^2$ (10 psig). The control valve maintains a constant air pressure at the nozzle when either the atomization air flow rate is changed and/or the fan air flow rate is changed of the pressure of the source air changes.

15 Claims, 2 Drawing Sheets

PRESSURE COMPENSATED HVLP SPRAY GUN

This application is a continuation of application Ser. No. 667,459, filed Mar. 11, 1991, now abandoned.

TECHNICAL FIELD

The invention relates to paint spray guns and more particularly to an improved high volume, low pressure (HVLP) air atomization paint spray gun for operation from a source of high pressure air.

BACKGROUND ART

With respect to the coating equipment industry in general, there exists many different methods to achieve atomization of a coating material for the desired purpose of coating a workpiece. In one general class of spray guns, compressed air is used to atomize the coating material. The most common air atomizing spray gun uses air pressures on the order of 1.75 to 3.5 Kg/cm$^2$ (25 to 50 psig) to achieve atomization, although pressures as high as 5.6 to 6.3 Kg/cm$^2$ (80 to 90 psig) or more may be used. These spray guns use a high air velocity which can sometimes reach sub to supersonic speeds to atomize the coating. However, the high air velocities impart a high velocity to the atomized coating material which in turn causes "bounce-back" of atomized coating particles from the painted surface, hence a less than ideal transfer efficiency. Atomized coating material which does not transfer to the workpiece is dispersed in the atmosphere to cause potential pollution problems and also increases the cost of coating the workpiece.

HVLP is a method of atomization utilized in paint spray gun atomizers, both hand-held and fixed mounted guns. Atomization is achieved in a similar manner to the more commonly know higher pressure air atomizing gun. The major difference is that an HVLP spray gun may not operate at dynamic air pressure of greater than 0.7 Kg/cm$^2$ (10 psig) measured upstream of the air nozzle. The 0.7 Kg/cm$^2$ (10 psig) limit for HVLP equipment is set by statute in some jurisdictions, such as the state of California. Reasonably good atomization occurs with HVLP spray guns because the relative size of the air jets in the air nozzle are significantly enlarged over the more conventional spray gun to pass a greater volume of air at the 0.7 Kg/cm$^2$ (10 psig) limit than could be obtained with conventional air atomizing spray gun at an equal pressure. The resultant higher volume of air tends to compensate for the lower upstream air pressure, and therefore approximately duplicates the available energy at the point of atomization. Owing to the lower available air pressure upstream of the air nozzle, as well as the larger air jets, the relative velocity of the air stream at the interactive point of atomization is considerably lower than with conventional air atomizing guns. This lower air velocity contributes to an overall "softer" spray cloud which, in turn, provides less bounce-back of the atomized coating material from the painted surface. Consequently, transfer efficiency increases and environmental concerns are reduced.

In one of the most common HVLP spray gun systems, the flow of high volume low pressure air is generated by an electrically driven vane compressor typically called a turbine compressor. The air is delivered to the gun via a relatively large diameter hose in the high volume, low pressure condition. In order to carry the required air flow volume at the low pressure, the hose typically has an internal diameter of at least 2 cm ($\frac{3}{4}$ inch) and may have an external diameter of on the order of 2.5 to 4 cm (1 to 1$\frac{1}{4}$ inches). As a consequence of the work imparted on the air by the turbine compressor, the delivered air will usually have an elevated temperature. The air is directed through the gun and through a manually operated proportioning valve generally at the front end of the gun, directly behind the air/fluid nozzle. The purpose of the proportioning valve is to direct the air to separate fan air and atomizing air ets in the air nozzle in order to control the relative amounts of air going to the different jets. The valve is typically designed to maintain a constant flow rate, so that a specific desired increase in atomizing air flow will cause a corresponding decrease in fan air. The reason for this is that the turbine compressor is typically a positive displacement, non-pressure compensated, non-pressure relieving device. Careful proportioning of the fan and atomizing air are thus important in order to prevent undesirable increases in back pressure between the gun and the compressor which could create excessive heat generation in the compressor, resulting in shorter compressor life. Thus, the fan and atomizing air must flow constantly from the air nozzle regardless of whether the paint is triggered on or off. One major drawback to such a system is that the relatively large and cumbersome air hose results in operator fatigue and also limits maneuverability of the spray gun. In addition, the adjustment of the fan air and atomizing air must be achieved through a delicate balance of both a bleed valve at the compressor and the proportioning valve on the gun.

Many facilities have "plant air" available with a line pressure of about 5.6 Kg/cm$^2$ (80 psig). Where plant air is not available, a conventional air compressor may be available. A variation of the above described HVLP paint spray system replaces the turbine compressor with plant air or another source of compressed air in the 2.8 to 6.3 Kg/cm$^2$ (40 to 90 psig) range. A manually adjusted self relieving air pressure regulator can be used to drop a relatively low flow of the high pressure air to a higher volume flow of low pressure air and such HVLP air is delivered through a large diameter hose to the spray gun. A constant air bleed is no longer needed in order to protect the compressor, provided the source includes a regulator of the self-regulating design. Nor is an air proportioning valve needed. However, a cumbersome air hose of the type used with a turbine compressor operated HVLP system must be used between the regulator and the spray gun to carry the needed air volume at a low pressure. Further, adjustments must be made at both the gun and the regulator to achieve proper atomization and a desired fan pattern.

An improvement to the HVLP spray gun operated from a high pressure air source involves delivering the high pressure air through a small diameter air hose to the spray gun and passing the air through either a calibrated fixed orifice or through an adjustable orifice in the form of a needle valve. The resulting pressure drop across the orifice provides the required lower air pressure at an expanded volume. Where an adjustable orifice is provided, the orifice at the valve seat can be suitably sized so that at the maximum open position and at the maximum supply air pressure, a dynamic air pressure of 0.7 Kg/cm$^2$ (10 psig) is never exceeded downstream of the needle valve. The advantage here is that a smaller compressed air hose, typically no greater than 1 cm ($\frac{3}{8}$ inch) inside diameter may be used, as compared to the significantly larger diameter air hose required to deliver a high volume flow of low pressure air. The disadvantages are that a needle valve can be clogged by foreign debris and that because this valve is not self-compensating, it is also negatively affected by changes in supply air pressure. Hence, a slight dip in supply air pressure will cause a corresponding undesirable dip in atomizing and fan air pressure at the air nozzle. Also, owing to the non-pressure compensating feature of the needle valve or fixed orifice, the orifice needs to be sized based on the various air nozzle versions for a given HVLP spray gun. For example, if the orifice size is determined based on a wide fan air nozzle, then using a narrow fan air nozzle (having less air flow) would cause a higher back pressure tending to exceed the 10 psig limit. Therefore, the orifice must be sized to accommodate the back pressure limitations of the lowest flow air nozzle, which then compromises the maximum attainable operating pressure with the higher flow, wider fan air nozzles. The result is that the wider fan air nozzles tend to provide a relative lower degree of atomization than the narrow fan air nozzles.

It is therefore desirable that an HVLP spray gun be capable of receiving the required air via a small diameter compressed air hose for increased maneuverability and to be able to convert the supplied high pressure air into a predetermined constant low pressure high volume air flow having a pressure which does not exceed 0.7 Kg/cm² (10 psig). It is further desirable that such a spray gun not be affected by the kinds of external influences described above, such as debris in the air line, air supply pressure variations, and various air nozzle designs which permit different air flow rates for a given gun operating air pressure.

DISCLOSURE OF INVENTION

The present invention is directed to an improved high volume, low pressure air atomization paint spray gun for operation from a source of high pressure air. The high pressure compressed air is delivered through a relatively small diameter hose to the spray gun. A pressure compensating control valve in the spray gun drops the high pressure to an expanded volume low pressure for operating the HVLP gun. The control valve is designed to accommodate the high volume flow and to have a minimum risk of clogging from any debris in the air line. By locating a pressure compensating control valve in the HVLP spray gun, the air pressure at the air nozzle can be automatically maintained at the desired maximum 0.7 Kg/cm² (10 psig) level or at a preset lower level, even though the air nozzle is changed or a fan air adjusting valve behind the fluid/air nozzle changes the total flow of atomization and fan air.

Accordingly, it is an object of the invention to provide an improved HVLP spray gun of the type capable of operating directly from a source of high pressure air.

Other objects and advantages of the invention will be apparent from the following detailed description and the accompanying drawings.

BEST MODE FOR CARRYING OUT THE INVENTION

Figure 1:
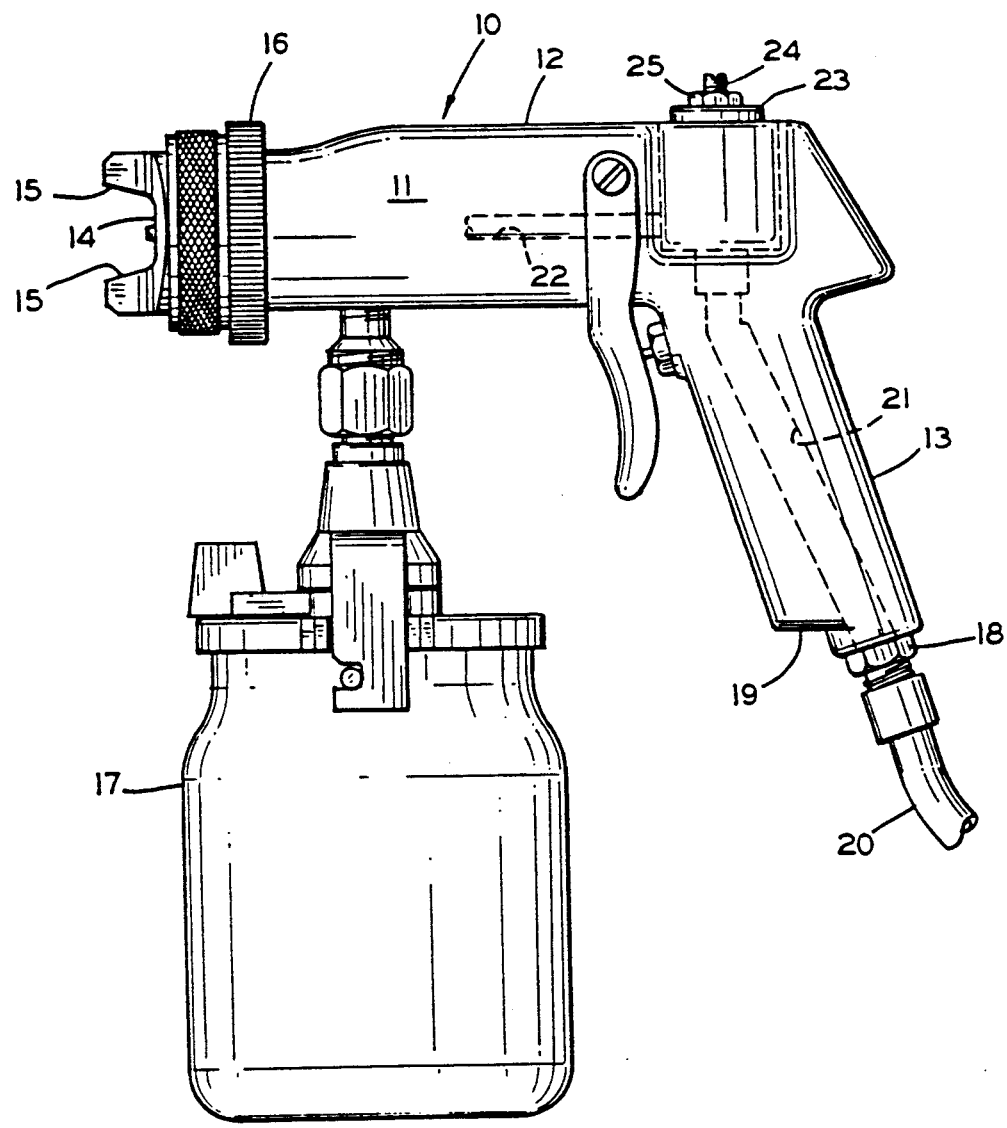
FIG. 1 is a side elevational view of an improved HVLP spray gun according to the invention.

Referring to FIG. 1 of the drawings, an improved HVLP spray gun 10 is shown according to the invention. the spray gun 10 includes a housing 11 consisting of a barrel 12 and an integral handle 13. On the end of the barrel 12 opposite the handle 13, a fluid/air nozzle 14 is releasably secured to the barrel 12. The nozzle 14 includes a central orifice (not shown) from which liquid is discharged and atomized by a high volume flow of low pressure air and includes two diametrically opposing horns or projections 15 containing fan air orifices (not shown) from which an adjustable flow of fan air may be directed at the envelope of atomized paint to impart a flat or fan shape to the envelope. A rotatable ring 16 is attached to the barrel 12 adjacent the nozzle 14. Rotating the ring 16 adjusts a fan air valve (not shown) to adjust the fan air between maximum and minimum flow rates, as is known in the art. A paint cup 17 is shown attached to the barrel 12 for supplying the liquid to be atomized through the barrel 12 to the nozzle 14.

A standard hose fitting 18 is attached to a lower end 19 of the handle 13 for attachment to a high pressure air hose 20. Because of the high air pressure, i.e., at least 2.8 Kg/cm² (40 psig), the hose 20 can have an inside diameter of no greater than 12 mm (½ inch) and preferably on the order of about 1 cm (⅜ inch). The air hose connects to an internal air passage 21 extending through the handle 13 to the barrel 12. A second internal air passage 22 (shown in fragmentary) extends through the barrel 12 to the nozzle 14.

According to the invention, a pressure compensated control valve 23 is located in the housing 11 between the passages 21 and 22. The control valve 23 includes a controlled variable orifice which drops the high pressure of the air received from the line 20 to a predetermined constant pressure of no greater than 0.7 Kg cm² (10 psig) for delivery through the passage 22 to the nozzle 14. A screw 24 on the control valve 23 permits a user of the spray gun 10 to adjust the predetermined air pressure delivered to the nozzle 14 to a pressure between 0 and 0.7 Kg/cm² (0 and 10 psig). Once the adjustment screw 24 is set, a jam nut 25 can be tightened to prevent accidental changes in the set pressure. If desired, a scale may be marked on the screw 24 to indicate the air pressure established by the different settings of the screw 24. The control valve 23 maintains the set air pressure delivered to the nozzle 14 during changes in the inlet air pressure from the hose 20, when the ring 16 is rotated to increase or decrease the flow of fan air, and when the nozzle components are changed to change the amount of atomization air flow.

Figure 2:
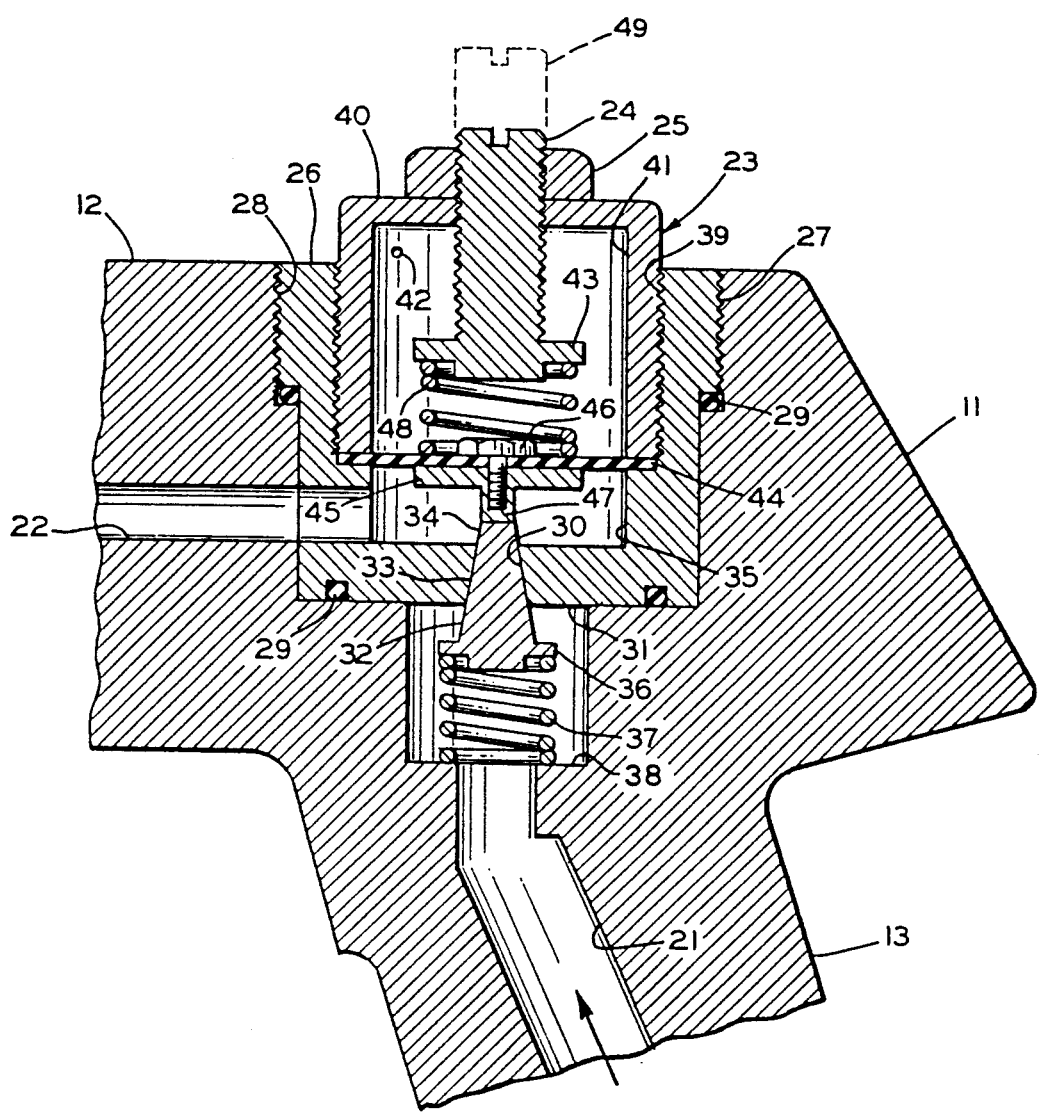
FIG. 2 is an enlarged fragmentary cross sectional view through a portion of the housing for the spray gun of FIG. 1, showing details of the pressure compensated control valve.

FIG. 2 is an enlarged fragmentary view showing details of the pressure compensated control valve 23. The control valve 23 has a body 26 having external threads 27 for engaging a correspondingly threaded opening 28 in the spray gun housing 11. Two 0-rings 29 form air tight seals between the housing 11 and the valve body 26. A tapered valve seat 30 is formed in a lower surface 31 of the valve body 26. The valve seat 30 is tapered to open towards the handle air passage 21. A valve needle 32 is shown with a conical section 33 seated on the valve seat 30. The valve needle 32 has an end 34 which projects through the valve seat 30 into a chamber 35 in the valve body 26. The chamber 35 connects through the valve body 26 to the barrel passage 22. An enlarged head 36 is formed on an end of the valve needle 32 opposite the projecting end 34. A valve needle bias spring 37 is compressed between the valve needle head 36 and a surface 38 in the spray gun housing 11. Both the spring 37 and the pressure of the air in the passage 21 act on the valve needle 32 to urge the valve needle 32 against the valve seat 33 to close the control valve 23.

The valve body 26 has an internally threaded opening 39. An externally threaded cap 40 is threaded into the body opening 26 to form a chamber 41. A vent 42 is provided through the cap 40 to maintain the chamber 41 at ambient pressure. The pressure adjustment screw 24 is threaded through the cap 40 and extends into the chamber 41, where it terminates at an enlarged diameter head 43. A resilient diaphragm 44 is clamped between the cap 40 and the valve body 26 to separate the chambers 41 and 35. At the center of the diaphragm 44, a diaphragm retainer 45 is located in the chamber 35. A bolt 46 located in the chamber 41 extends through the center of the diaphragm 44 and engages the retainer 45 to secure the retainer 45 to the diaphragm 44. The retainer 45 has a central projection 47 which abuts the valve needle end 34. A pressure control spring 48 located in the chamber 41 is compressed between the head 43 on the adjustment screw 24 and the diaphragm 44 to press the retainer projection 47 against the valve needle end 34.

In operation, the pressure control spring 48 exerts a greater pressure on the valve needle 32 than does the combined forces of the needle bias spring 37 and the air pressure in the passage 21. Consequently, the valve needle 32 is moved away from the seat 30 to create a relatively large annular orifice. Air flows from the passage 21 through the open orifice into the chamber 35. Air entering the chamber 35 flows through the passage 22 to the nozzle 14. Initially, the valve needle 32 will separate from the seat 30 to form a relatively large annular orifice. Consequently, air pressure will build up in the chamber 35 and at the nozzle 14. As the air pressure builds up in the chamber 35, it acts against the diaphragm. When the pressure on the diaphragm becomes sufficient, the diaphragm moves and the valve needle 32 correspondingly is moved by the spring 37 to decrease the size of the annular orifice. Accordingly, the position of the valve needle 32 is automatically adjusted to maintain a constant pressure in the chamber 35 and, hence, a constant pressure at the nozzle 14. Because of the pressure drop due to the restricted size of the annular orifice, there is a corresponding volume increase to the lower pressure air flowing into the chamber 35. As flow requirements at the nozzle 14 change or as the supply pressure changes, the valve needle position will be changed by the diaphragm 44 to maintain the pressure at the nozzle 14. It will be seen that adjusting the screw 24 will change the force exerted by the spring 48 on the diaphragm 44 and consequently will adjust the air pressure in the chamber 35. The spring 48 may be selected to provide a maximum air pressure in the chamber 35 of 0.7 Kg/cm$^2$ (10 psig) when the screw 24 is set to the illustrated position and to provide a minimum air pressure, e.g., 0 Kg/cm$^2$, in the chamber 35 when the screw 24 is set to the position 49 shown in dashed lines.

It will be noted that the design of the conical valve needle section 33 and of the tapered valve seat 30 provides a relatively large diameter annular orifice when the valve needle 32 is moved from the seat 30. This construction has two benefits. First, the annular orifice is less subject to clogging from any debris in the air line 20. Second, the large diameter permits a relatively large air flow through the control valve 23 to provide the high volume of air required to supply the relatively large atomization air and fan air orifices in the nozzle of an HVLP spray gun.

It should be noted that the location of the control valve 23 in the spray gun housing 11 is not critical. The control valve 23 may be located between a trigger actuated air valve (not shown) and the nozzle 14, or it may be located between the air fitting 18 on the handle 13 and the trigger actuated air valve. It will be appreciated that various other modifications and changes may be made to the above described HVLP spray gun without departing from the spirit and the scope of the following claims.

I claim:

1. An improved high volume, low pressure air atomization spray gun capable of operation from a source of high pressure air, having a pressure of at least 2.8 Kg/cm$^2$ and including a hose for delivering said high pressure air to said spray gun, and for receiving liquid to be atomized from a liquid source, comprising:

a housing comprising a horizontally disposed, radially extending barrel portion, and a vertically disposed, axially extending handle portion having air inlet means for attachment to said air hose for receiving said high pressure air delivered by said air hose;

first axially extending passage means defined within said handle portion of said housing and fluidically connected to said air inlet means for conducting said high pressure air into said handle portion of said housing;

a high pressure air chamber defined within said handle portion of said housing and fluidically connected to said first passage means at a location remote from said air inlet means for receiving high pressure air from said first passage means;

air and fluid nozzle means attached to a distal, free end of said horizontally disposed, radially extending barrel portion of said housing for atomizing said liquid;

second radially extending passage means defined within said barrel portion of said housing and fluidically connected to said air and fluid nozzle means for delivering low pressure air to said air and fluid nozzle means;

a low pressure air chamber defined within said housing at a junction defined between said handle and barrel portions of said housing so as to fluidically connected to said second radially extending passage means at a location remote from said air and fluid nozzle means for delivering low pressure air to said second radially extending passage means;

a valve seat interposed between and separating said high pressure chamber from said low pressure chamber; and variable control valve means, movably disposed within said valve seat and extending between said low pressure chamber and said high pressure chamber so as to be responsive to pressure within said first and second pressure means, and within said high and low pressure chambers, for automatically adjusting said pressure within said second radially extending passage means to a predetermined constant, low pressure value of not greater than 0.7

Kg/cm² and for maintaining said predetermined low pressure constant during changes in the pressure of said high pressure air and during changes in the flow rate of said air through said air and fluid nozzle means.

2. An improved high volume, low pressure air atomization spray gun, as set forth in claim 1, wherein said control valve means includes means for setting said predetermined low pressure to between 0 and 0.7 Kg/cm².

3. An improved, high volume, low pressure air atomization spray gun, as set forth in claim 2, wherein:
said valve seat comprises a tapered valve seat;
said control valve means comprises a tapered valve needle located within said high pressure air chamber and having an end extending through said tapered valve seat into said low pressure air chamber;
a needle bias spring is located within said high pressure air chamber such that said needle bias spring and said high pressure air urge said tapered valve needle to engage said tapered valve seat;
a diaphragm separates said low pressure air chamber from an ambient air chamber;
a plunger is attached to said diaphragm and is disposed within said low pressure air chamber so as to abut said valve needle end; and
a pressure control spring is mounted within said ambient air chamber so as to urge said diaphragm and said attached plunger toward said valve needle so as to push said valve needle away from said tapered valve seat so as to allow air to flow from said high pressure air chamber between said tapered valve needle and said tapered valve seat and into said low pressure air chamber and thence to said second radially extending passage means and said nozzle means, the pressure of said high pressure air dropping to said predetermined low pressure as it flows between said tapered valve needle and said tapered valve seat, and wherein said predetermined low pressure acts upon said diaphragm so as to vary the air flow through said control valve means so as to maintain said predetermined low pressure at said nozzle means.

4. An improved high volume, low pressure air atomization spray gun, as set forth in claim 3, wherein said means for setting said predetermined low pressure between 0 and 0.7 Kg/cm² includes means for adjusting the pressure exerted by said pressure control spring on said diaphragm.

5. A spray gun as set forth in claim 4, wherein:
said means for adjusting said pressure exerted by said pressure control spring upon said diaphragm comprises an adjustment screw threadedly engaged within said housing and engaging said pressure control spring.

6. A spray gun as set forth in claim 3, wherein:
said needle bias spring is interposed between an end wall of said high pressure air chamber and an opposite end of said tapered valve needle.

7. An improved, high volume, low pressure air atomization spray gun as set forth in claim 3, further comprising:
an air outlet port defined within a sidewall of said low pressure air chamber for fluidically connecting said low pressure air chamber to said second radially extending passage means, said air outlet port being defined at an axial position within said sidewall of said low pressure air chamber which substantially corresponds to the abutment junction defined between said valve needle end and said plunger of said diaphragm whereby said low pressure air is communicated directly to said second radially extending passage means and said air and fluid nozzle means without further pressure restrictions.

8. An improved high volume, low pressure air atomization spray gun, as set forth in claim 1, wherein said spray gun includes a fan air adjusting valve means between said nozzle means and said control valve means for controlling the flow of fan air to said nozzle means.

9. An improved high volume, low pressure air atomization spray gun capable of operating from a source of high pressure air, having a pressure of at lest 2.8 Kg/cm² and including an air hose for delivering said high pressure air to said spray gun, and for receiving liquid to be atomized from a liquid source, comprising:
a housing comprising a horizontally disposed, radially extending barrel portion, and a vertically disposed, axially extending handle portion having air inlet means for attachment to said air hose for receiving said high pressure air delivered by said air hose;
first axially extending passage means defined within said handle portion of said housing and fluidically connected to said air inlet means for conducting said high pressure air into said handle portion of said housing;
a high pressure air chamber defined within said handle portion of said housing and fluidically connected to said first passage means at a location remote from said air inlet means for receiving high pressure air from said first passage means;
air and fluid nozzle means attached to a distal, free end of said horizontally disposed, radially extending barrel portion of said housing for atomizing said liquid;
second radially extending passage means defined within said barrel portion of said housing and fluidically connected to said air and fluid nozzle means for delivering low pressure air to said air and fluid nozzle means;
a low pressure air chamber defined within said housing at a junction defined between said handle and barrel portions of said housing so as to be fluidically connected to said second radially extending passage means at a location remote from said air and fluid nozzle means for delivering low pressure air to said second radially extending passage means; and
variable control valve means for lowering said pressure of said high pressure air to a predetermined low pressure valve of not greater than 0.7 Kg/cm² and for maintaining said predetermined low pressure during changes in said pressure of said high pressure air and during changes in the flow rate of said air through said air and fluid nozzle means,
said variable control valve means comprising a tapered valve seat interposed between and separating said high pressure air chamber and said low pressure air chamber; a tapered valve needle disposed within said high pressure air chamber and having an end portion thereof extending through said tapered valve seat and into said low pressure air chamber so as to define with said tapered valve seat an annular valve orifice; a valve needle biasing spring disposed within said high pressure air chamber for biasing, along with said high pressure air disposed within said high pressure air chamber, said valve needle toward said tapered valve seat; diaphragm means for separating said low pressure air chamber from an ambient air chamber and for engaging said end portion of said tapered valve needle disposed within said low pressure air chamber; and a pressure control spring disposed within said ambient air chamber and engaged with said diaphragm means for biasing said tapered valve needle away from said tapered valve seat so as to allow air to flow from said high pressure air chamber, through said annular valve orifice, and into said low pressure air chamber and said second radially extending passage means, and to said air and fluid nozzle means, said pressure of said high pressure air dropping to said predetermined low pressure as said air flows through said annular valve orifice whereby said predetermined low pressure acts upon said diaphragm means so as to vary said air flow through said variable control valve means so as to maintain said predetermined low pressure at said air and fluid nozzle means.

10. A spray gun as set forth in claim 9, wherein:
said control valve means includes means for adjusting said predetermined low pressure value to a value within the range of 0–0.7 Kg/cm$^2$.

11. A spray gun as set forth in claim 10, wherein:
said adjusting means comprises an adjustment screw threadedly engaged within said housing and extending into said ambient air chamber for engaging said pressure control spring.

12. A spray gun as set forth in claim 9, wherein:
said needle biasing spring is interposed between an end wall of said high pressure air chamber and an opposite end portion of said tapered valve needle.

13. A spray gun as set forth in claim 9, further comprising:
fan air adjusting valve means interposed between said nozzle means and said control valve means for controlling the flow of fan air to said nozzle means.

14. An improved, high-volume, low-pressure air atomization spray gun as set forth in claim 9, further comprising:
plunger means fixedly attached to said diaphragm means and disposed within said low pressure air chamber for abutting said valve needle end portion.

15. An improved, high-volume, low-pressure air atomization spray gun as set forth in claim 14, further comprising:
an air outlet port defined within a sidewall portion of said low pressure air chamber for fluidically connecting said low pressure air chamber directly to said second radially extending passage means, said air outlet port being defined at an axial position within said sidewall portion of said low pressure air chamber which substantially corresponds to the abutment junction defined between said valve needle end portion and said plunger means of said diaphragm means whereby said low pressure air in communicated directly to said second radially extending passage means and said air and fluid nozzle means without further pressure restrictions.

* * * * *